United States Patent [19]

Bolstad et al.

[11] Patent Number: 5,109,497

[45] Date of Patent: Apr. 28, 1992

[54] ARITHMETIC ELEMENT CONTROLLER FOR CONTROLLING DATA, CONTROL AND MICRO STORE MEMORIES

[75] Inventors: Gregory D. Bolstad, Orange; Steven P. Davies, Ontario, both of Calif.

[73] Assignee: Hughes Aircraft Company, Los Angeles, Calif.

[21] Appl. No.: 303,786

[22] Filed: Jan. 27, 1989

[51] Int. Cl.5 .......................................... G06F 12/00
[52] U.S. Cl. .................................. 395/425; 364/965.5; 364/242.6; 364/927.97; 364/964.1
[58] Field of Search ... 364/200 MS File, 900 MS File

[56] References Cited

U.S. PATENT DOCUMENTS

| | | | |
|---|---|---|---|
| 3,766,532 | 10/1973 | Liebel | 364/200 |
| 4,041,461 | 8/1977 | Kratz | 364/200 |
| 4,224,668 | 9/1980 | Peters | 364/200 |
| 4,272,828 | 6/1981 | Negi | 364/900 |
| 4,370,709 | 1/1983 | Fosdick | 364/200 |
| 4,409,652 | 10/1983 | Neumann | 364/200 |
| 4,450,525 | 5/1984 | Demuth | 364/200 |
| 4,453,214 | 6/1984 | Adcock | 364/200 |
| 4,471,432 | 9/1984 | Wilhite | 364/200 |
| 4,490,782 | 12/1984 | Dixon | 364/200 |
| 4,541,045 | 9/1985 | Kromer | 364/200 |
| 4,541,048 | 9/1985 | Propster et al. | 364/200 |
| 4,542,455 | 9/1985 | Demeure | 364/200 |
| 4,760,525 | 7/1988 | Webb | 364/200 |
| 4,760,545 | 7/1988 | Inagami | 364/200 |
| 4,794,517 | 12/1988 | Jones | 364/200 |
| 4,800,486 | 1/1989 | Horst | 364/200 |
| 4,811,267 | 3/1989 | Ando | 364/900 |
| 4,825,356 | 4/1989 | Ohkami | 364/200 |
| 4,847,757 | 7/1989 | Smith | 364/200 |
| 4,862,407 | 8/1989 | Fette | 364/900 |
| 4,886,523 | 5/1990 | Ferguson | 364/200 |

Primary Examiner—Thomas C. Lee
Assistant Examiner—Eric Coleman
Attorney, Agent, or Firm—Wanda K. Denson-Low

[57] ABSTRACT

An arithmetic element controller which provides for memory address generation for three independent memories of a signal processor and for direct memory access from external devices by way of an interface to the control and data store memories. The arithmetic element controller comprises a first address generator which includes a general purpose address generator circuit and three separate address generator circuits which generates memory addresses for data store, control store and micro store memories, respectively. A second address generator comprises two address generator circuit which comprise memory address logic that generate memory addresses that permit direct memory addressing of the control store and data store memories by way of the interface. A memory access controller is coupled to the two address generators to control access to the respective data store and control store memories by the respective address generators. The memory access controller comprises arbitration logic which arbitrates between requests for data store memory access and control store memory access. The second address generator comprises a cache memory which stores sets of control parameters provided by the control store memory, which control parameters comprise segment, offset bias and word count data. An adder, which adds the offset and segment parameters to generate a data store memory address, and decrementing logic utilizes the count parameter to determine the number of words to transfer to the data store memory. A second adder combines the bias and offset parameters to provide a new offset which is stored in the cache memory.

9 Claims, 5 Drawing Sheets

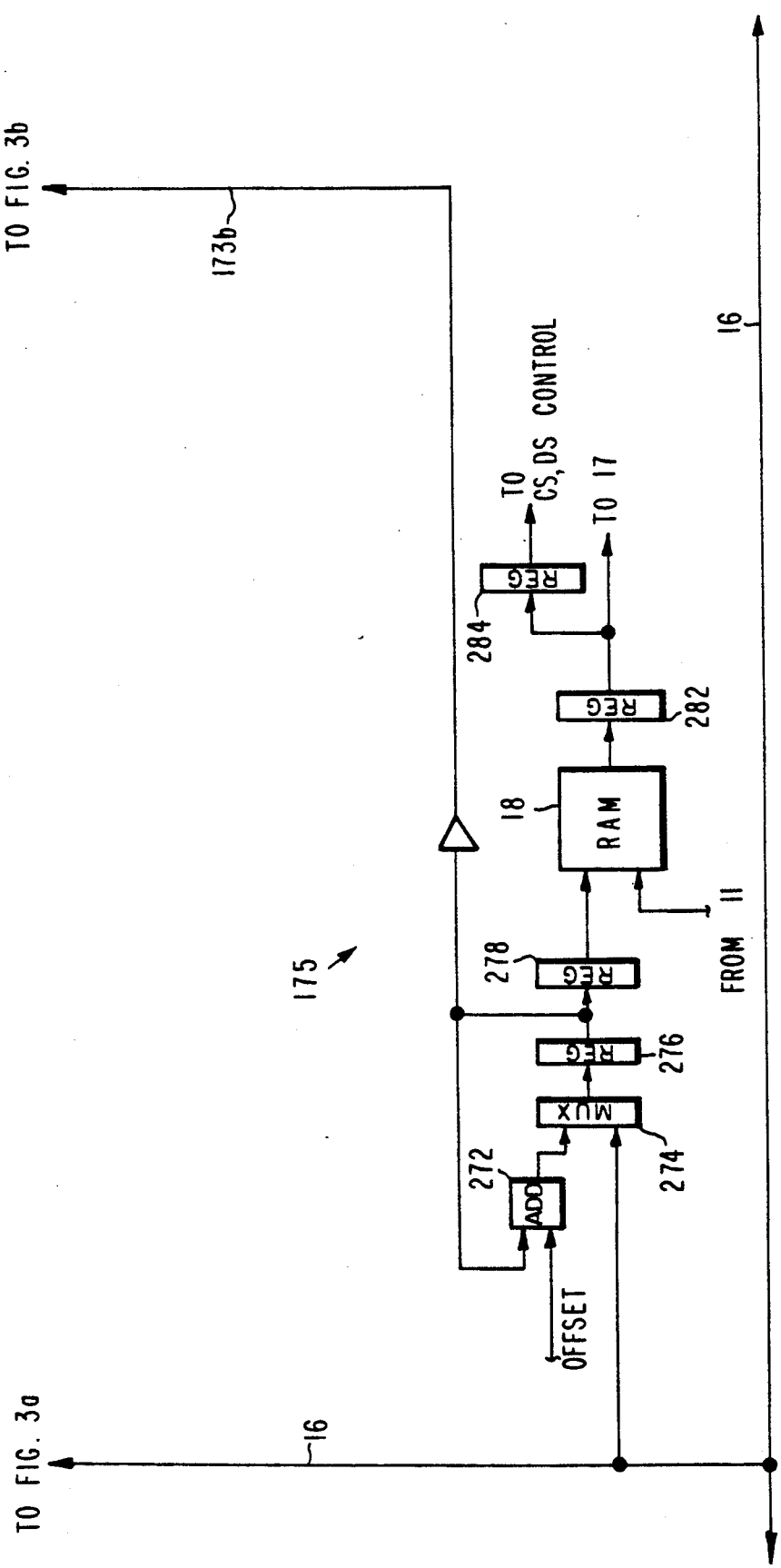

ARITHMETIC ELEMENT CONTROLLER FOR CONTROLLING DATA, CONTROL AND MICRO STORE MEMORIES

BACKGROUND OF THE INVENTION

The present invention generally relates to digital signal processing systems and in particular to an arithmetic element controller for use in such systems that provides for address generation for three separate memories and for direct memory access of two of those memories from external devices.

The ability to perform sophisticated vector and scalar arithmetic operations in real time is a key requirement of signal processing systems. Often, however, this requirement is also accompanied by severe physical constraints upon the size, weight, power and cooling of the signal processing system. In the past, signal processor designers have had to compromise among competing requirements, many times resulting in processors with less than adequate performance.

Conventional signal processors may also be limited in performance due to relatively slow system clock rates of around five megahertz, and limited capability to operate on 16 bit fixed point data. The fixed point operational limitations of the conventional signal processor have become significant in many application environments. Many signal processing algorithms require arithmetic computations having a large dynamic range, making 32 bit floating point processing necessary.

The ability to network modular signal processors allows a system to efficiently meet a wide range of applications. Many signal processors are limited in their capability for networking.

With reference to the present invention, the implementation of hardware which efficiently provides for the generation of memory addresses for signal processor memories and for addresses which provides for direct memory access of data storage memories from external device is a key to efficient operation of a state of the art networkable signal processing system.

SUMMARY OF THE INVENTION

In order to overcome the limitations of conventional controllers for use in signal processors, the present invention provides for an arithmetic element controller which has a plurality of address generators which generate memory addresses for three memories, including data store, control store and microprogram store memories, and which generates memory addresses for the data store memory which permits external networked processors to have access thereto. A memory access controller provides arbitration logic that efficiently controls access to the memories due to competing requests.

The arithmetic element controller may be employed with a signal processor having an interface that couples control and data signals from external devices. The signal processor comprises a plurality of memory storage elements including a data store memory, a control store memory and a micro store memory.

The arithmetic element controller is utilized internally within the signal processor to control reading and writing of the memories and in conjunction with an interface that couples control and data signals from external devices to the plurality of memory storage elements. The arithmetic element controller comprises a first address generator coupled to the data store memory, control store memory and micro store memory, respectively, which generates memory addresses therefor in response to control signals derived from the micro store memory. A second address generator is coupled to the interface and the control store and data store memories which processes memory requests derived from the interface to generate control storage memory addresses which read parameters stored in the control store memory and from which data store memory addresses are generated. The memory access controller is coupled to the first and second address generators which controls access to the respective data store and control store memories thereby.

The first address generator comprises general purpose address generator logic circuit which provides for complex memory addressing and three separate address generator logic circuits which independently generate memory addresses for the data store, control store and a micro store memories, respectively. These separate address generator logic circuits permit reading and writing of data to the three memories from internal devices within the signal processor that are coupled to the controller.

The second address generator comprises a controller which receives memory access requests by way of the interface and generates control store memory and data store memory requests in response thereto. Address generation logic is coupled to the interface and the controller and receives data signals concerning the source of the memory request, and control signals from the control store memory and generates control store memory and data store memory addresses in response thereto.

The memory access controller is coupled to the first and second address generators and the data store and control storage memories which controls access to the respective memories. The memory access controller comprises arbitration logic which arbitrates between requests for data store memory access and control store memory access.

The second address generator comprises a cache memory that stores sets of control parameters received from the control store memory, which control parameters comprise segment, offset, bias and word count data. An adder is coupled to the cache memory which adds the offset and segment parameters to generate a data store memory address. A decrementing logic circuit and second adder are also coupled to the cache memory. The decrementing logic circuit utilizes the count parameter to determine the number of words to transfer to the data store memory. The second adder combines the bias and offset parameters to provide a new offset which is stored in the cache memory.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIG. 3a-c are detailed data flow diagrams diagrams illustrating the logic circuits of the first address generator of the arithmetic element controller of FIG. 2.

DETAILED DESCRIPTION

Figure 1:
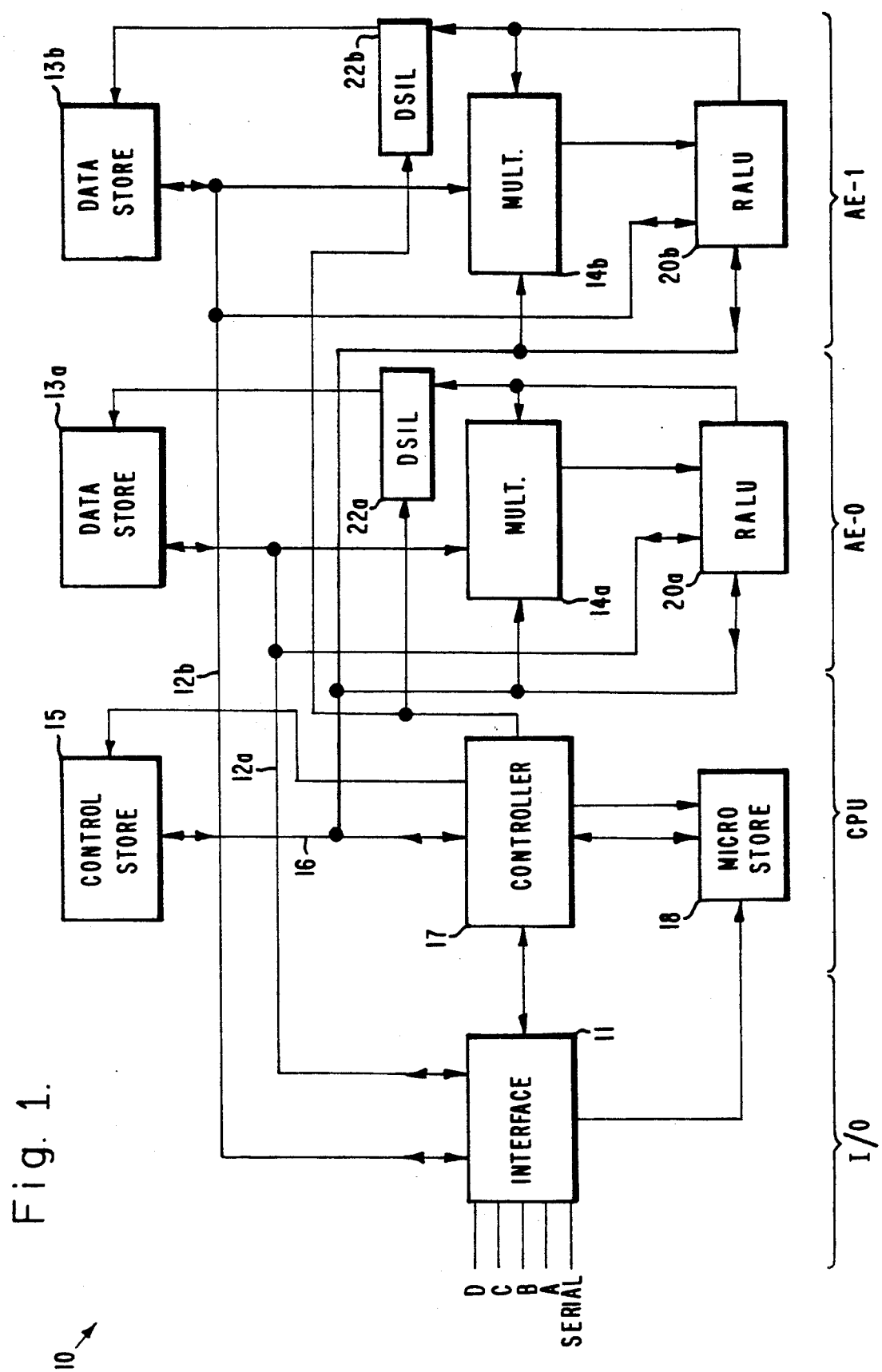
FIG. 1 is a block diagram of a signal processor incorporating the arithmetic element controller of the present invention.

Referring to FIG. 1 shown therein is a block diagram of a signal processor 10 incorporating a arithmetic element controller 17 in accordance with the principles of the present invention. The signal processor 10 will be described in general terms to provide a context for the describing the arithmetic element controller 17.

The signal processor 10, shown in FIG. 1, generally comprises four main sections: an input/output section, designated as I/O, a central processing unit designated as CPU, and two arithmetic elements, designated as AE0 and AE1. The input/output section includes an external interface unit 11 which provides a plurality of configurable input/output ports. The external interface unit 11 is coupled by way of data busses 12a, 12b to two data store memories 13a, 13b, that are employed to store data, and to two multipliers 14a, 14b, and two register arithmetic logic units 20a, 20b which operate on the data. The data store memories 13a, 13b typically store data in a predefined packed format in order to conserve memory space, in a manner which is generally known in the art.

A control store memory 15, which is employed to store control codes, is coupled by way of a control store bus 16 to the arithmetic element controller 17, to the multipliers 14a, 14b and to two register and arithmetic logic units 20a, 20b. A micro store memory 18 is coupled to the arithmetic element controller 17 and is employed to store microcode instructions which are utilized by the the control store memory 15, the data store memories 13a, 13b, the multipliers 14a, 14b, and the register and arithmetic logic units 20a, 20b.

While the present invention is disclosed with reference to its incorporation in the the above-described signal processor 10 and architecture, it is not restricted to use therewith. The present invention may be employed as a stand alone processor suitable for applications other than the above-described processor.

The processor 10 generally functions as follows. Signals to be processed by the processor 10 are received by way of the computer interface 11 and stored in the data store memories 13a, 13b. Microcode instructions defining the processing parameters of the arithmetic elements of the processor and what steps are to be performed by the arithmetic elements AE0, AE1, are stored in the micro store memory 18. An application program consisting of pointers to microcode instructions, programmable coefficients to be used by the arithmetic elements during computations, and intermediate data processing results from the arithmetic elements are stored in the control store memory 15. The arithmetic element controller 17 executes application programs which cause the microcode instructions to be executed and the data to be processed. The arithmetic elements AE0, AE1, operate as parallel pipeline processors, to process the data in accordance with the microcode instructions, under control of the arithmetic element controller, and in a conventionally understood manner.

Control parameters are passed from the control store memory 15 to the multipliers 14a, 14b and the register and arithmetic logic units 20a, 20b, and the data from the data store memories 13a, 13b are processed by the arithmetic elements AE0 and AE1, under control of the arithmetic element controller 17 in a conventionally understood manner.

Figure 2:
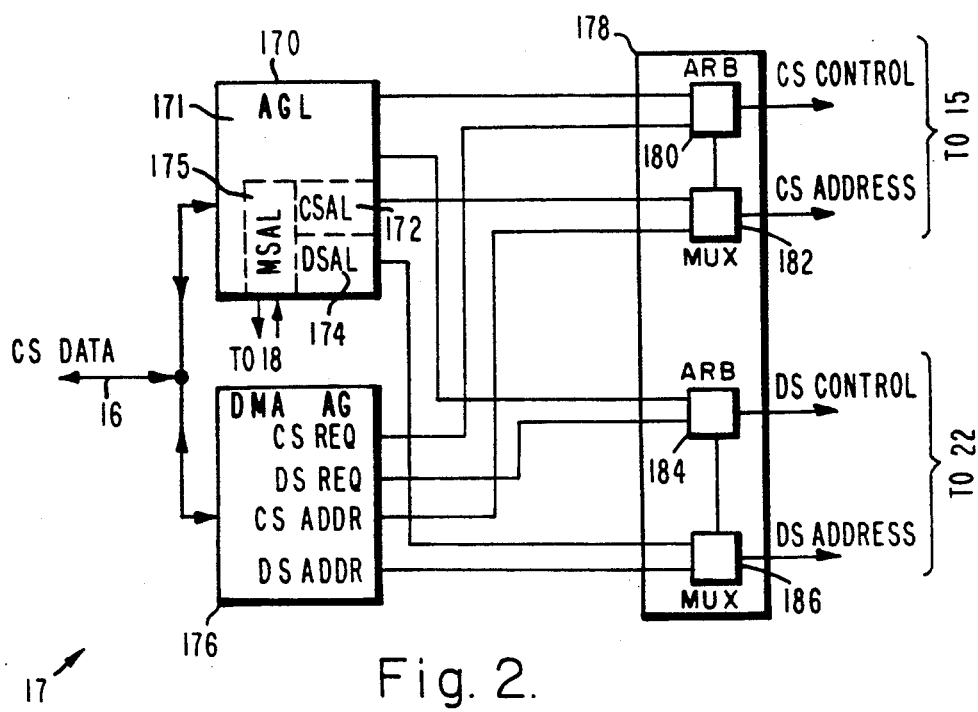
FIG. 2 is a block diagram of the arithmetic element controller of FIG. 1.

FIG. 2 is a block diagram of the arithmetic element controller 17 of FIG. 1. The arithmetic element controller 17 includes a first address generator 170 which comprises four address generator logic circuits, including a general purpose address generator logic circuit 171, and control store memory address logic 172, data store memory address logic 174 and micro store memory address logic 175. The first address generator 170 is coupled to the control store memory 15 by way of the control store bus 16.

The control store memory 15 is also coupled to a second address generator 176 which comprises control store and a data store address generators which will be more fully described below. The two address generators of the second address generator 176 will hereinafter be designated as control store address generator 176a and data store address generator 176b, respectively. The control store address generator 176a and data store address generator 176b are also coupled to the external interface unit 11 and control store memory 15.

Outputs from the first address generator 170, including the general purpose address logic circuit 171, control store address logic circuit 172, data store address logic circuit 174, and outputs from the second address generator 176, including the control store address generator 176a and data store address generator 176b are coupled to inputs of a memory access controller 178. As shown in FIG. 2, the memory access controller 178 is comprised of control store and data store arbitration circuits. The control store arbitration circuit comprises arbitration logic 180 and a multiplexer 182, and the data store arbitration circuit is substantially identical and comprises arbitration logic 184 and a multiplexer 186. Outputs from the respective address generator circuits are respectively coupled to the memory access controller 178 such that control store request lines are coupled to the control store arbitration logic 180 while the data store request lines are coupled to the data store arbitration logic 184, and the corresponding control store and data store address lines are coupled to corresponding control store multiplexer 182 and data store multiplexer 186.

In general, the address generator 17 of FIG. 2 operates as follows. The arithmetic unit 212 is used to provide address and control calculations. The register file 204 is used to store intermediate values. The extended register file 206 is used to store the status of input and output transfers from the interface unit 11, immediate data from the micro store memory 18, and program control values. The multiplexers 208, 210 allow the selection of various input sources for the arithmetic unit 212. The multiplexer 228 is used to select the output of the arithmetic unit 212 or the output of one of the address registers to load the register files. The register 232 and multiplexer 230 are used to format data to be written back to the control store memory 15.

Figure 3A:
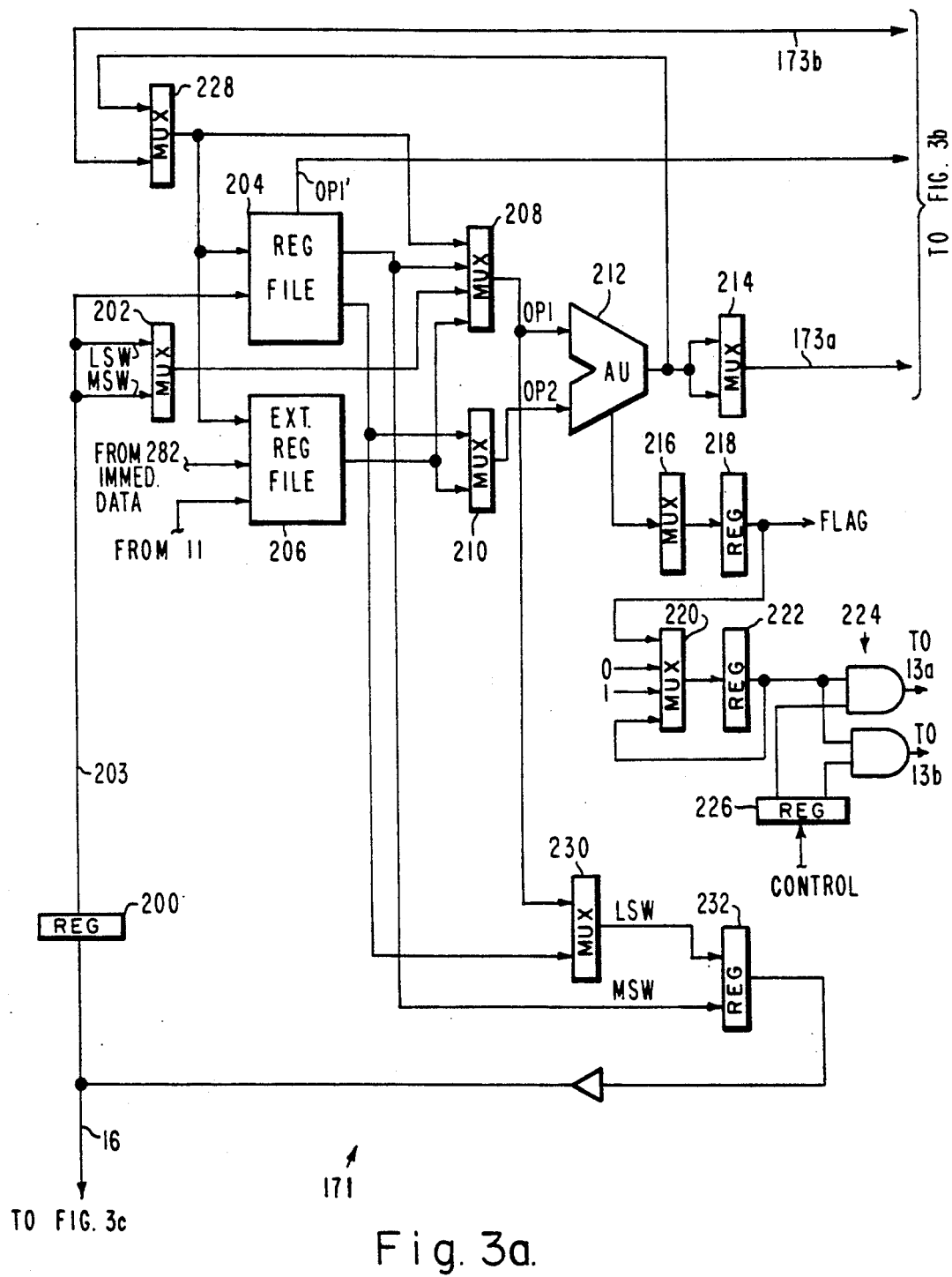
Figure 3B:
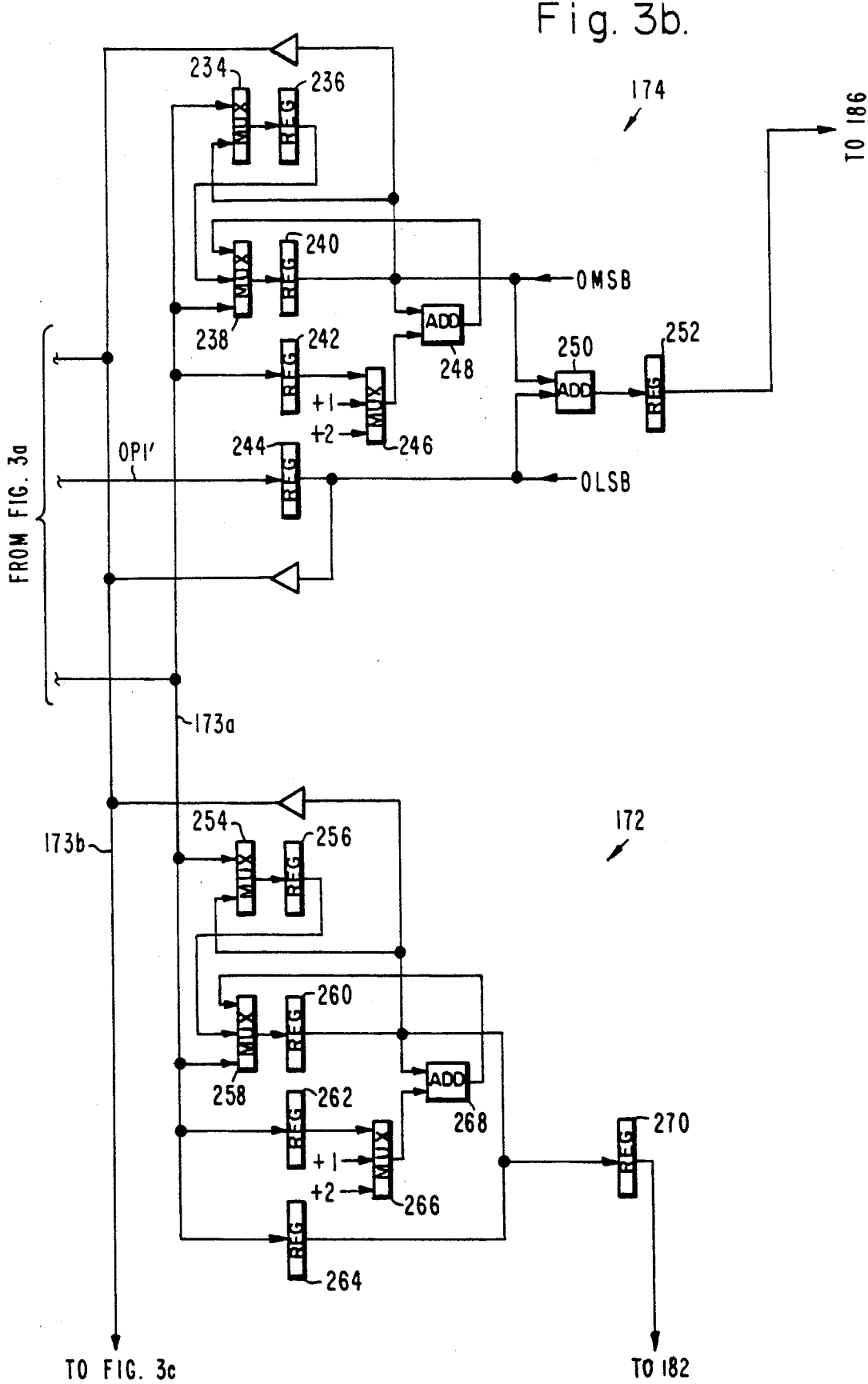

FIGS. 3a-c show detailed data flow diagrams for the address generator 170, control store address logic 172 and data store address logic 174, and micro store address logic 175, respectively. With reference to FIG. 3a, the address generator 170 comprises an input register 200 which interfaces to the control store bus 16. A first two-input multiplexer 202 is coupled between an input bus 203 and a four-input multiplexer 208. The input bus 203 is also coupled to a register file 204 whose first output is coupled to the four-input multiplexer 208 and to an output multiplexer 232. The second output of the register file 204 is coupled to a second two-input multiplexer 230. Outputs of the four-input multiplexer 208 and third two-input multiplexer 210 are coupled to an arithmetic unit 212, whose output is coupled by way of a fourth two-input multiplexer 214 to the data and control store address logic 176a, 176b. The multiplexer 214 is adapted to select normal or bit reversed addressing. In addition, the output of the arithmetic unit 212 is fed back to a fifth two-input multiplexer 228 which provides inputs to the register file 204 and to an extended register file 206. The output of the extended register file 206 is coupled to the second input of the third two-input multiplexer 210, whose output is coupled to the second input of the arithmetic unit 212.

A register 218 is employed as a flag to control conditional operations. Multiplexer 216 is adapted to select one of four flag outputs from the arithmetic unit 212, including carry output (CO), less than zero (LT), equal to zero (E0) and greater than zero (GT). Conditional arithmetic unit operations are executed on true (TR) or false (FA) state of the flag. Two AND gates 224, generate write enable signals for the data store memories 13a, 13b. The write enable signals may be individually controlled by way of register 226 or controlled as a group by way of register 222. Register 222 may be set, cleared, its current value held, or loaded from the above-described flag in accordance with selection provided by the multiplexer 220.

Referring to FIG. 3b, the control store address logic 172 and data store address logic 174 are shown. Each of these circuits is substantially similar to the other except for an additional adder in the data store address logic 174. For purposes of description, the data store address logic 174 comprises two input multiplexers 234, 238, whose inputs are provided by the arithmetic unit 212 of FIG. 3a. The output from the first two-input multiplexer 234 is coupled by way of a register 236 to an input of the second two-input multiplexer 238. The output of the second two-input multiplexer 238 is coupled by way of a register 240 to an input of an adder 250. A plurality of zeros are added to this portion of the word indicated by the 0 MSB input line. A 16 bit word provided by the register 240 is combined with 5 bits from the 0 MSB line to generate a 21 bit memory word. This provides the ability to address a larger memory space. The remaining input of the three-input multiplexer 238 is provided by way of a three-input multiplexer 246 from the output of a second adder 248.

The register file 204 provides an output by way of a register 244 to a second input of the adder 250 whose output is coupled by way of a register 252 to the data store memory 13. A plurality of zeros are again combined with the output of the register file 204 to provide a 21 bit word employing the 0 LSB input line. The second adder has its second input coupled to the arithmetic unit 212 by way of a three input multiplexer 246.

FIG. 3c shows the micro store address generator logic circuit 175 which is employed to access the micro store memory 18. The construction details of the micro store address generator logic circuit 175 are self evident from FIG. 3c and will not be discussed in detail. In operation, the micro store address generator logic circuit 175 has three modes of operation, including jump, step and branch. The jump mode is used to start execution of a micro store primitive routine. The starting address of the routine is stored in the control store memory 15. The jump mode is executed by reading the start address from the control store memory 15 over the control store bus 16, by way of the multiplexer 274 and into registers 276 and 278. The step mode is executed by incrementing the contents of register 276. The branch mode is executed by using adder 272 to add an offset value from the micro instruction to the current contents of register 274. Registers 278, 282 and 284 are delay registers which provide the desired signal timing.

Figure 4:
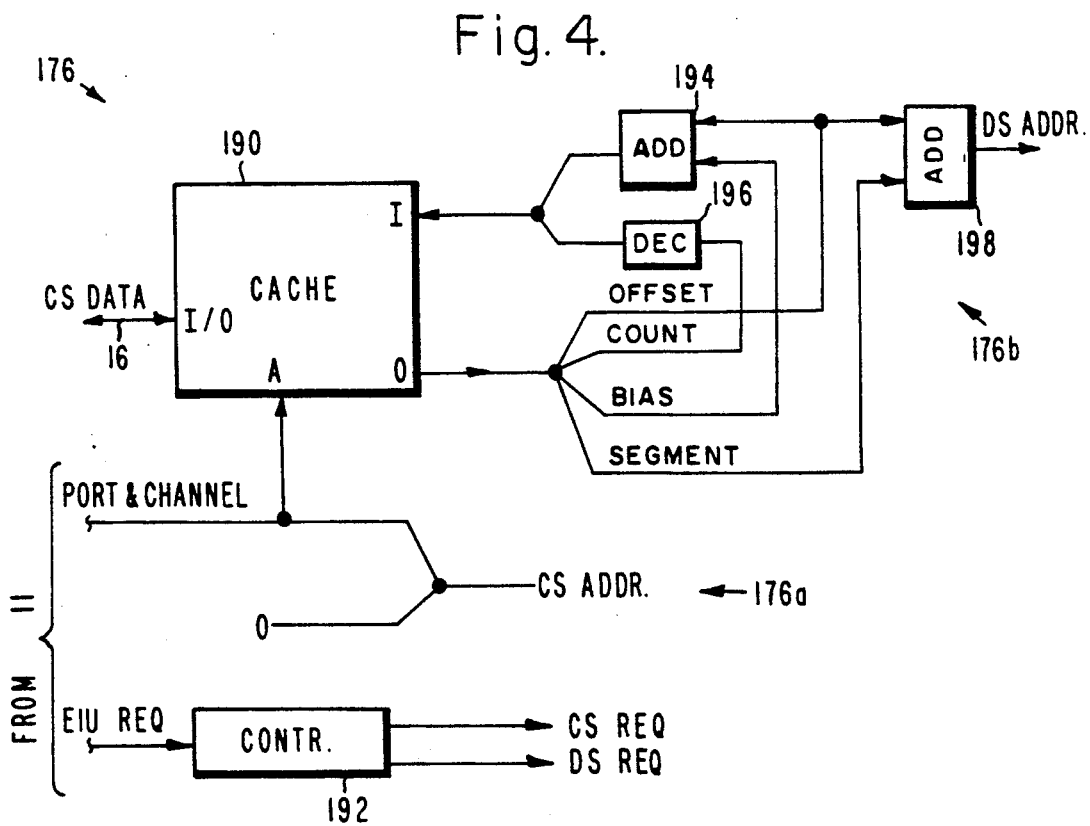
FIG. 4 is a block diagram illustrating both the circuits comprising the second address generator of the arithmetic element controller of FIG. 2.

With reference to FIG. 4, it shows a block diagram illustrating the second address generator 176 comprising its two address generators 176a, 176b. In particular, the address generator 176a comprises a cache memory 190 having an input coupled to the control store bus 16 and which receives control store data thereover. An output of the cache memory 190 comprises offset, count bias and segment data signals of which the offset and segment signals are coupled to an output adder 198 which in turn is coupled to the data store memory 13. The bias and offset signals are coupled to a second adder 194 which is employed to combine the signals and overwrite the cache memory 190 with new address information. The decrement logic 196 uses the count signal to count the number of words that are to be transferred to or from the data store memory 13 during a transfer.

In addition a controller 192 is provided which is coupled to the external interface unit 11 and provides control store and data store request signals. Port and channel signals are also provided by the external interface unit 11 which are coupled with 0 to produce control store addresses and which are used to address the cache memory 190 as shown.

The controller 192 accepts memory requests from the interface 11 and generates control store and data store memory requests therefrom. Parallel port and channel information identifying the specific data port (A, B, C, D) over which transmission is occurring and the specific channel (1 to 16) which is supported by the interface 11 is provided to the cache memory 190 and a control store memory address is provided.

The control store and data store requests and control store addresses are used to read parameters stored in the cache memory 190 from which are generated data store memory addresses. The parameters include offset, word count, bias and segment data. The offset and segment data is combined to generate the data store memory addresses in a conventional manner. The bias and offset data are combined to generate a new offset which is stored in the cache memory 190. The count data is decremented and stored in the cache memory 190.

With reference to FIG. 3a, the extended register file includes a program counter (PC), an executive pointer (EP), condition flag (CF), mail mask (MM), mail flags (MF), trap mask (TM) and micro store counter (MPC) registers. In addition, the control store memory has a memory allocation scheme such that I/O parameters, including the offset, count bias and segment parameters for each channel are stored in low memory, while above this section is an executive buffer and then the application program occupies the balance of the memory space. The micro store storage memory stores primitives which are employed by the arithmetic element controller 17.

No control lines or logic have been shown in the drawing for either the signal processor 10, or for the arithmetic element controller 17 of the present invention. However, Table 1 below shows a 64 bit microcode word having opcode mnemonics identified therein wherein bits 36-63, are employed by the arithmetic element controller 17. The abbreviations used in Table 1 are as follows: MOD is the modifier field; OPER is the operator field; OP1 and OP2 are generic operands which represent busses, register, or immediate data and control; CR is the CS address field; DR is the DS address field; CS is the CS access field; and DS is the DS access field.

TABLE 1

| Unit | Word Partitioning | | |
|---|---|---|---|
| | Bits | Field | Comment |
| Address Generator | 63-60 | MOD | |
| | 59-57 | OPER | |
| | 56-53 | OP1 | Data/Offset |
| | 52-49 | OP2 | Data/Offset |
| | 48-46 | CR | |
| | 45-43 | DR | |
| Memory access | 42-39 | CS | |
| | 38-36 | DS | |
| Mutliplier | 35-34 | A | Status/Mode Register (SMR) |
| | 33-31 | B | SMR |
| | 30-28 | MOP | SMR |
| RALU | 27-26 | I | SMR |
| | 25 | FLG | SMR |
| | 24-21 | MD | SMR |
| | 20-15 | RPO | SMR |
| | 14-10 | A | SMR |
| | 9-5 | B | SMR |
| | 4 | S | SMR |
| | 3-2 | DE | Reserved |
| | 1,0 | FI,FO | Reserved |

Table 2a lists the operands for the address generator. The operands may be registers, bus contents or immediate data and control values, as listed below. Table 2b lists the modifiers for the address generator. The modifiers specify auxiliary operations which are performed in conjunction with the address generator operator function.

TABLE 2a

| | Address Generator Operands |
|---|---|
| Operand | Description |
| Ai | General purpose register, i = 0 to 15 decimal |
| Bj | General purpose register, j = 0 to 15 decimal |
| PC | Program counter register |
| EP | Executive pointer register |
| CC | Control store address counter |
| DC | Data store address counter |
| SR | Data store segment register |
| CS | Least significant word of control store bus, read only |
| CL | Most significant and least significant words of control store bus, read only |
| MC | Micro program counter |
| TM | Trap mask register |
| MM | Mail mask register |
| MF | Mail flags register |
| CR | Condition flags register |
| CP | Control store page register |
| ID | Immediate data register |
| −128:255 | Decimal number (1 or 2 operands) |
| X'00':X'FF' | Hexadecimal number |
| <label> | Seven character alphanumeric label |
| <smr> | Mnemonics which specify status mode register |

TABLE 2b

| | Address Generator Modifiers | |
|---|---|---|
| Modifier | Definition | Description |
| NO | No modification | No modification of operator |
| LT | AGFLG: = 1\|0 (bus 16<0) | Set AGFLG if bus 16 is less than 0, else clear AGFLG |
| EQ | AGFLG: = 1\|0 (bus 16<=0) | Set AGFLG if bus 16 = 0, else clear AGFLG |
| GT | AGFLG: = 1\|0 (bus 16>0) | Set AGFLG if bus 16 is greater than 0, else clear AGFLG |
| CO | AGFLG: = 1\|0 (carry) | Set AGFLG if carry occurs, else clear AGFLG |
| EW | DSWEN: = 1 | Set data store write enable flag |
| DW | DSWEN: = 0 | Clear data store write enable flag |
| CE# | DSWEN: = AGFLG | Set data store write enable flag to AGFLG |
| TR | op\|nop (AGFLG) | Do operation if AGFLG = 1, else do default operation |
| FA | nop\|op (AGFLG) | Do operation if AGFLG = 0, else do default operation |
| BR | bus 16 = br(bus 16) | Select bit reverse input on mux 214 |
| BS | bus 16 = br(bus 16), register 244: = op1' | Select bit reverse input on mux 214 and load register 214 from register op1' |
| LS | register 244 = op1' | Load register 244 from register op1' |
| ML | op\|nop (MM and MF) | Do operation based on (MM and MF) |
| CS | register 276: = LSW (bus 16) | Load register 276 from least significant word of bus 16 |
| EX | register 276: = 0 | Load register 276 with zero |

Tables 3a through 3l show the valid combinations of modifiers, operators and operands which may be combined to move data between the source and destination files, as indicated. Any modifier in the first column may be combined with any operator listed in the second column, and so on for the two OP columns.

TABLE 3a

| Arithmetic Element Controller Instructions | | | | | | | |
|---|---|---|---|---|---|---|---|
| Register File (source) to register file (destination) | | | | | | | |
| Modifier msdata<60:63> | | Operator msdata<57:59> | | OP1 msdata<53:56> | | OP2 msdata<49:52> | |
| NO | 0 | MOV | 0 | AGi | 0:15 | AGi | 0:15 |
| CE | 1 | NEG | 1 | | | | |
| DW | 2 | INC | 2 | | | | |
| EW | 3 | DEC | 3 | | | | |

TABLE 3a-continued

Arithmetic Element Controller Instructions
Register File (source) to register file (destination)

| Modifier msdata<60:63> | | Operator msdata<57:59> | | OP1 msdata<53:56> | | OP2 msdata<49:52> | |
|---|---|---|---|---|---|---|---|
| CO | 4 | ADD | 4 | | | | |
| LT | 5 | SUB | 5 | | | | |
| EQ | 6 | OAD | 6 | | | | |
| GT | 7 | OSU | 7 | | | | |
| FA | 8 | | | | | | |
| TR | 9 | | | | | | |
| LS | A | | | | | | |
| BR | B | MOV | 1 | AGi | 0:15 | AGi | 0:15 |
| | | ADD | 3 | | | | |
| BS | B | MOV | 0 | AGi | 0:15 | AGi | 0:15 |
| | | ADD | 2 | | | | |

TABLE 3b

Arithmetic Element Controller Instructions
Register file (source) to extended register file (destination)

| Modifier msdata<60:63> | | Operator msdata<57:59> | | OP1 msdata<53:56> | | OP2 msdata<49:52> | |
|---|---|---|---|---|---|---|---|
| NO | E | MOV | 0 | AGi | 0:15 | MM | 8 |
| | | NEG | 1 | | | MF | 9 |
| | | INC | 2 | | | CF | A |
| | | DEC | 3 | | | PC | D |
| | | ADD | 4 | | | EP | E |
| | | SUB | 5 | | | TM | F |
| | | OAD | 6 | | | | |
| | | OSU | 7 | | | | |
| NO | F | MOV | 5 | AGi | 0:15 | CP | 8 |
| | | | | | | DI | 9 |
| | | | | | | CI | A |

TABLE 3c

Arithmetic Element Controller Instructions
Extended register file (source) to register file (destination)

| Modifier msdata<60:63> | | Operator msdata<57:59> | | OP1 msdata<53:56> | | OP2 msdata<49:52> | |
|---|---|---|---|---|---|---|---|
| NO | C | MOV | 0 | DC | 0 | AGj | 0:15 |
| | | | | CC | 1 | | |
| | | | | MC | 2 | | |
| | | | | CS | 3 | | |
| | | | | SR | 4 | | |
| | | | | CP | 5 | | |
| | | | | MM | 8 | | |
| | | | | MF | 9 | | |
| | | | | CF | A | | |
| | | | | ID | C | | |
| | | | | PC | D | | |
| | | | | EP | E | | |
| | | | | TM | F | | |

TABLE 3d

Arithmetic Element Controller Instructions
Extended register file (source) to register file (destination)

| Modifier msdata<60:63> | | Operator msdata<57:59> | | OP1 msdata<53:56> | | OP2 msdata<49:52> | |
|---|---|---|---|---|---|---|---|
| NO | F | MOV | 0 | DC | 0 | MM | 8 |
| | | NEG | 1 | CC | 1 | MF | 9 |
| | | INC | 2 | MC | 2 | CF | A |
| | | DEC | 3 | CS | 3 | PC | D |
| | | | | SR | 4 | EP | E |
| | | | | CP | 5 | TM | F |
| | | | | MM | 8 | | |
| | | | | MF | 9 | | |
| | | | | CF | A | | |
| | | | | ID | C | | |
| | | | | PC | D | | |
| | | | | EP | E | | |
| | | | | TM | F | | |

TABLE 3e

Arithmetic Element Controller Instructions
Control store long word (source) to register file (destination)

| Modifier msdata<60:63> | Operator msdata<57:59> | | OP1 msdata<53:56> | | OP2 msdata<49:52> | |
|---|---|---|---|---|---|---|
| NO | B | MOV | 4 | CL | 7 | AGj | 0:15 |

TABLE 3f

Arithmetic Element Controller Instructions
Register file (source) to register file (destination)

| Modifier msdata<60:63> | Operator msdata<57:59> | | OP1 msdata<53:56> | | OP2 msdata<49:52> | |
|---|---|---|---|---|---|---|
| NO | B | AND | 5 | AGi | 0:15 | AGj | 0:15 |
|    |   | NOT | 6 |     |      |     |      |

TABLE 3g

Arithmetic Element Controller Instructions
Immediate data loads

| Modifier msdata<60:63> | Operator msdata<57:59> | | OP1 msdata<53:56> | OP2 msdata<49:52> |
|---|---|---|---|---|
| NO | F | LIL | 6 | 8 bit data |
| NO | F | LIM | 7 | 8 bit data |

TABLE 3h

Arithmetic Element Controller Instructions
Bit operands

| Modifier msdata<60:63> | Operator msdata<57:59> | | OP1 msdata<53:56> | | OP2 msdata<49:52> | |
|---|---|---|---|---|---|---|
| NO | D | SAV | 0 | AGi | 0:15 | AGj | 0:15 |
|    |   | TST | 1 |     |      |     |      |
|    |   | CLR | 2 |     |      |     |      |
|    |   | SET | 3 |     |      |     |      |

TABLE 3i

Arithmetic Element Controller Instructions
Register file (source) to register file (destination) shift operations

| Modifier msdata<60:63> | Operator msdata<57:59> | | OP1 msdata<53:56> | | OP2 msdata<49:52> | |
|---|---|---|---|---|---|---|
| NO | D | SRA | 4 | AGi | 0:15 | AGj | 0:15 |
|    |   | SRL | 6 |     |      |     |      |
|    |   | SL0 | 6 |     |      |     |      |
|    |   | SL1 | 7 |     |      |     |      |

TABLE 3j

Arithmetic Element Controller Instructions
Register file or extended register file (source) to control store (destination)

| Modifier msdata<60:63> | Operator msdata<57:59> | | OP1 msdata<53:56> | | OP2 msdata<49:52> | |
|---|---|---|---|---|---|---|
| NO | F | OUT | 4 | AGi | 0:15 | AGj | 0:15 |
| NO | B | OUT | 7 | DC | 0 |     | x    |
|    |   |     |   | CC | 1 |     |      |
|    |   |     |   | MC | 2 |     |      |
|    |   |     |   | CS | 3 |     |      |
|    |   |     |   | SR | 4 |     |      |
|    |   |     |   | CP | 5 |     |      |
|    |   |     |   | MM | 8 |     |      |
|    |   |     |   | MF | 9 |     |      |
|    |   |     |   | CF | A |     |      |
|    |   |     |   | ID | C |     |      |
|    |   |     |   | PC | D |     |      |
|    |   |     |   | EP | E |     |      |
|    |   |     |   | TM | F |     |      |

TABLE 3k

Arithmetic Element Controller Instructions
Jump and branch instructions

| Modifier msdata<60:63> | | Operator msdata<57:59> | OP1 msdata<53:56> | OP2 msdata<49:52> |
|---|---|---|---|---|
| CS | C | JMP | 1 | x | x |
| EX | C | JMP | 2 | x | x |
| NO | C | JMP | 3 | 8 bit relative offset | |
| ML | C | JMP | 4 | 8 bit relative offset | |
| TR | C | JMP | 5 | 8 bit relative offset | |
| FA | C | JMP | 6 | 8 bit relative offset | |

TABLE 3l

Arithmetic Element Controller Instructions
Initialize and data store write enable operations

| Modifier msdata<60:63> | | Operator msdata<57:59> | | OP1 msdata<53:56> | | OP2 msdata<49:52> | |
|---|---|---|---|---|---|---|---|
| NO | C | INT | 7 | AGi | 0:15 | AGj | 0:15 |
| NO | F | DSE | 5 | DS1 | 0:1 | DS0 | 0:1 |

Tables 4a through 4d describe the operation code mnemonics for the arithmetic element controller 17.

TABLE 4a

OP Code Mnemonics

| Mnemonic | CR Field | Description |
|---|---|---|
| H | 0 | No operation |
| LC | 1 | Load register 260 from bus 173a |
| LR | 2 | Load register 256 from bus 173a |
| X | 3 | Exchange contents of register 260 and register 256 |
| +1, +2 | 4 | Increment register 260 by one or two according to access |
| +1 | 5 | Increment register 260 by register 262 |
| 1x, 2x | 6 | Increment register 260 by one or two according to access and exchange contents of register 260 and register 256 |
| IX | 7 | Increment register 260 by register 262 and exchange contents of register 260 and register 256 |

TABLE 4b

OP Code Mnemonics

| Mnemonic | DR Field | Description |
|---|---|---|
| H | 0 | No operation |
| LC | 1 | Load register 240 from bus 173a |
| LR | 2 | Load register 236 from bus 173a |
| X | 3 | Exchange register 240 and register 236 |
| +1, +2 | 4 | Increment register 240 by one or two according to access |
| +1 | 5 | Increment register 240 by register 242 |
| 1x, 2x | 6 | Increment register 240 by one or two according to access and exchange register 240 and register 236 |
| IX | 7 | Increment register 260 by register 262 and exchange register 240 and register 236 |

TABLE 4c

OP Code Mnemonics

| Mnemonic | CS Field | Description |
|---|---|---|
| NS | 0 | No operation |
| NL | 1 | No operation |
| LR | 2 | Enable output register 214 onto the control store bus 16 |
| ENA | 3 | Enable output register 214 onto the control store bus 16 |
| ES0 | 4 | Enable Status Mode Register from 14a, 20a |
| EN0 | 5 | Enable RALU 20a |
| ES1 | 6 | Enable Status Mode Register from 14b, 20b |
| EN1 | 7 | Enable RALU 20b |
| RS | 8 | Read control store memory 15 short word |
| RL | 9 | Read control store memory 15 long word |
| WSA | A | Write control store memory 15 short word from controller 17 |
| WLA | B | Write control store memory 15 long word from controller 17 |
| WS0 | C | Write control store memory 15 short word from RALU 20a |
| WL0 | D | Write control store memory 15 long word from RALU 20a |
| WS1 | E | Write control store memory 15 short word from RALU 20b |
| WL1 | F | Write control store memory 15 long word from RALU 20b |

TABLE 4d

OP Code Mnemonics

| Mnemonic | DS Field | Description |
|---|---|---|
| NS | 0 | No operation |
| NL | 1 | No operation |
| ES | 2 | Send RALU 20a output to interface 11 |
| EL | 3 | Read interface 11 status word into RALU 20a |
| RS | 4 | Read data store memory 13 short word |
| RL | 5 | Read data store memory 13 long word |
| WS | 6 | Write data store memory 13 short word |
| WL | 7 | Write data store memory 13 long word |

The operation code mnemonics for the external interface unit 11 are provided in Tables 5a and 5b.

TABLE 5a

OP Code Mnemonics

| eiuc<8:9> | MODE | Description |
|---|---|---|
| 3 | Run | Both the address generator logic circuit 170 and the address generator 176 are running normally |
| 2 | Run/Hold | The address generator logic circuit 170 is halted while the address generator 176 is running normally |
| 1 | Halt | Both the address generator logic circuit 170 and the address generator 176 are halted, but enabled for built in test. |
| 0 | Halt/Hold | Both the address generator logic circuit 170 and the address generator 176 are halted. |

TABLE 5b

OP Code Mnemonics

| eiuc<0:7> | MODE | Description |
|---|---|---|
| 0 | NOOP | No operation |
| 1 | DSIN | Increment register 240 |
| 2 | LDS0 | Increment register 240, enable data store memory write |
| 3 | LDS1 | Increment register 240, enable data store memory write |
| 5 | LCSC | Load register 260 from register 262 <0:15> |
| 6 | LDSS | Load register 244 from register 262 <16:31> |
| 7 | LDSC | Load register 240 from register 262 <0:15> |
| 8 | TAEC | Transfer micro store word (bus 13a to bus 16) and load bus 16 into control store memory input register 262 |
| 9 | LDCS | Increment register 260, enable control store memory write |
| C | LMPC | Load register 276 from register 262<0:15> |
| D | MSIN | Increment register 282 and enable micro store memory read cycle |
| 10 | LDAE | Load micro store word, increment register 276, micro store write enable |
| 18 | WRMS | Enable micro store data word onto micro store bus |
| 21 | RMPC | Output register 276 data onto control store bus 16 <0:15> |
| 23 | RCSC | Output register 260 data onto control store bus 16 <0:15> |
| 24 | RDCS | Enable control store memory read cycle |
| 25 | RCSI | Enable control store memory read cycle, increment register 260 |
| 26 | RDSS | Output register 244 data onto control store bus 16 <0:15> |
| 27 | RDSC | Output register 240 data onto control store bus 16 <0:15> |
| 2A | OMPC | Reload register 276 from holding register |
| 2C | OCSC | Reload register 260 from holding register |
| 30 | RDAE | Enable micro store memory read cycle, transfer micro command register 282 data to control store bus 16 <4:31> |
| 34 | RAEI | Enable micro store memory read cycle, transfer register 282 data to control store bus 16 <4:31>, increment register 276 |
| 38 | RDAC | Enable micro store memory read cycle, transfer register 282 data to control store bus 16 <4:31> |
| 3C | RACI | Enable micro store memory read cycle, transfer register 282 data to control store bus 16 <4:31> |
| 42 | ODSC | Reload register 240 from holding register |
| 44 | RDDS | Enable data store memory read cycle |
| 45 | RDSI | Enable data store memory read cycle, increment register 240 |
| 48 | RESET | Reset (initialize) storage elements |

Thus there has been described a new and improved a arithmetic element controller that provides for address generation for three separate memories and for direct memory access to two of those memories from external devices. It is to be understood that the above-described embodiment is merely illustrative of some of the many specific embodiments which represent applications of the principles of the present invention. Clearly, numerous and other arrangememts can be readily devised by those skilled in the art without departing from the scope of the invention.

What is claimed is:

1. An arithmetic element controller for use with a computer interface coupled to the controller that couples control and data signals from external devices to the controller, and a pulurlity of memory storage elements comprising a data store memory, a control store memory and a micro store memory, said arithmetic element controller comprising:

first address generation means coupled to the data store memory, control store memory and micro store memory, respectively, for generating memory addresses therefor in response to control signals stored in the control store memory, said first address generation means including a general purpose address generator coupled to the control store memory for receiving control signals therefrom and comprising a register file and an extended register file whose outputs are coupled to an arithmetic unit which processes output singals derived therefrom a and which provides inputs to data store and control store memory address logic means;

data store memory address logic means coupled between the general purpose address generator and the data store memory for generating data store memory addresses in response to signals provided by the general purpose address generator;

control store memory address logic means coupled between the general purpose address generator and the control store memory for generating control store memory addresses in response to signals provided by the general purpose address generator; and micro store memory address logic means coupled to the control store memory and the micro store memory for generating memory addresses for the micro store memory;

second address generation means coupled to the interface and the control store and data store memories for processing memory requests received by way of the interface and for generating control storage memory addresses in response thereto, which addresses the control storage memory and reads out parameters stored therein and from which data store memory addresses are generated, said second address generation means including controller means for receiving memory access requests from the interface and for generating separate control storage memory and data store memory requests therefrom; and address generation logic means for receiving control signals from the control store memory and for generating data store memory addresses therefrom; and memory access controller means coupled to the first and second address generation means, for controlling access to the respective data store and control store memories by the respective first and second address generation means.

2. The arithmetic element controller of claim 1 wherein the memory access controller means comprises:

arbitration logic means coupled to the first and second address generation means, for arbitrating between requests for data store memory access and control store memory access therefrom.

3. The arithmetic element controller of claim 1 wherein the second adderess generation means comprises:

controller means for receiving memory access requests from the interface and for generating separate control store memory and data store memeory requests therefrom; and address generation logic means coupled to the interface for receiving data signals concerning the source of the memory request, and for receiving control signals from the control memory and for generating control store memory and data store memory addresses therefrom.

4. The arithmetic element controller of claim 3 wherein the address generation logic means comprises:

cache memory means for storing sets of control parameters received from the control store memory, which control parameters comprise segment, offset bias and word count data;

means for adding the offset and segment parameters to generate a data store memory address;

decrementing logic means for utilizing the count parameter in determining the number of word to transfer to the data store memory; and second adder means for combining the bias and offset parameters to provide a new offset means which is stored in the cache memory means.

5. The arithmetic element controller of claim 1 wherein the address generation logic means comprises:

cache memory means for storing sets of control parameters received from the control store memory, which control parameters comprise segment, offset bias and word count data;

means for adding the offset and segment parameters to generate a data store memory address;

decrementing logic means for utilizing the count parameter in determining the number of words to transfer to the data store memory; and second adder means for combining the bias and offset parameters to provide a new offset which is stored in the cache memory means.

6. An arithmetic element controller for use with an interface which couples control and data signals from external devices, and a plurality of memory storage elements comprising a data store memory, a control store memory and a micro store memory, said arithmetic element controller comprising:

first address generation means for generating memory addresses for the data, control and micro store memories which permits reading and writing of data thereto in response to control signals derived from the micro memory;

second address generation means comrising:

control store memory address generation means for generating memory addresses for the control store memory which permits reading and writing of data thereto;

data store memory address logic means coupled to the interface, the address generation means and the data store memory for generating memory addresses which permit direct memory addressing of the data store memory from the interface; and control store memory address logic means coupled to the interface, the address generation means and the control store memory for generating memory addresses which permit direct memory addressing of the control store memory by way of the interface, said control store memory address logic means comprising controller for receiving memory access requests from the interface and for generating separate control storage memory and data store memory requests therefrom;

address generation logic means for receiving control signals from the control store memory and for generating data store memory addresses therefrom; and memory access controller means coupled between the address generation means, the data store memory address logic means and the control store storage memory address logic means, for controlling access to the respecitve data store memory and control store memory by the respecive address generation and address logic means, said memory access controller including arbitration logic means for arbitrating between requests for data store memory access and control store memory access.

7. The arithmetic element controller of claim 6 wherein the data store memory address logic means comprises:
controller means for receiving memory access requests from the interface and for generating separate control storage memory and data store memory requests therefrom; and
address generation logic means for receiving control signals from the control store memory and for generating data store memory addresses therefrom.

8. The arithmetic element controller of claim 7 wherein the address generation logic means comprises:
cache memory means for storing sets of control parameters received from the control store memory, which control parameters comprise segment, offset bias and word count data;
means for adding the offset and segment parameters to generate a data store memory address;
decrementing logic means for utilizing the count parameter in determining the number of words to transfer to the data store memory; and
second adder means for combining the bias and offset parameters to provide a new offest which is stored in the cache memory means.

9. The arithmetic element controller of claim 6 wherein the address generation logic means comprises:
cache memeory means for storing sets of control parameters received from the control store memory, which control parameters comprise segment, offset bias and word count data;
means for adding the offset and segment parameters to generate a data store memory address;
decrementing logic means for utilizing the count parameter in determining the number of words to transfer to the data store memory; and
second adder means for combining the bias and offset parameters to provide a new offset which is stored in the cache memory means.

* * * * *